United States Patent [19]

Mori

[11] Patent Number: 4,848,940

[45] Date of Patent: Jul. 18, 1989

[54] TYPEWRITER FOR FORMAT PRINTING

[75] Inventor: Masaharu Mori, Anjo, Japan

[73] Assignee: Brother Kogyo Kabushiki Kaisha, Japan

[21] Appl. No.: 947,911

[22] Filed: Dec. 29, 1986

[30] Foreign Application Priority Data

Jan. 8, 1986 [JP] Japan ................................. 61-2588

[51] Int. Cl.[4] .......................................... G06F 11/00
[52] U.S. Cl. ...................................... 400/64; 400/76; 400/279
[58] Field of Search ...................... 400/61, 64, 62, 74, 400/76, 279

[56] References Cited

U.S. PATENT DOCUMENTS

| 3,415,278 | 10/1975 | Spence | 400/64 |
| 4,270,865 | 6/1981 | Kinishi | 400/74 X |
| 4,330,217 | 5/1982 | Churgovich et al. | 400/64 |
| 4,448,557 | 5/1984 | Hau et al. | 400/279 |
| 4,462,701 | 7/1984 | Czysyczenshi et al. | 400/64 X |
| 4,498,150 | 2/1985 | Gaudet et al. | 400/64 X |
| 4,556,332 | 12/1985 | Maekawa | 400/64 X |
| 4,668,963 | 5/1987 | Tanabe et al. | 400/64 X |
| 4,671,683 | 6/1987 | Ueno et al. | 400/61 |

FOREIGN PATENT DOCUMENTS

| 26303 | 4/1981 | European Pat. Off. | 400/64 |
| 2835320 | 2/1979 | Fed. Rep. of Germany | 400/64 |
| 3504710 | 8/1985 | Fed. Rep. of Germany | 400/64 |

OTHER PUBLICATIONS

IBM Tech. Disc. Bulletin, "Format Control Function", Adam et al., vol. 25, No. 1, Jun. 1982, pp. 217-220.

Primary Examiner—Edgar S. Burr
Assistant Examiner—James R. McDaniel
Attorney, Agent, or Firm—Oliff & Berridge

[57] ABSTRACT

A typewriter having an operation mode selector key so as to easily select either of two print mode settings; a first print mode setting in which print data are printed between left and right margins set by a margin set key; and a second print mode setting in which print data are printed from a left margin set by the margin set key and the carriage is returned in accordance with format data stored in a memory.

8 Claims, 13 Drawing Sheets

TYPEWRITER FOR FORMAT PRINTING

BACKGROUND OF THE INVENTION

This invention relates to a typewriter which executes printing on a printing medium with its printing mechanism in response to printing information such as character data and return data inputted through the operation of various keys on a keyboard.

A typewriter of this type is known which stores print data such as character data and format data such as left and right margin data inputted from a keyboard in memory means, e.g., a text memory, and which then reads out the print data from the memory means and executes printing in response to the print data in a format based on the format data.

Prior art typewriter, however, has a following problem. When printing is executed in response to print data stored in the memory means of the typewriter, left and right margins directly set on the typewriter are used in preference to margins based on format data stored in the memory means. Thus, when printing is required in the same format as the stored format data, each time the left and right margins set on the typewriter should be changed to the margins corresponding to the stored format data.

SUMMARY OF THE INVENTION

The object of the invention is therefore to provide a typewriter with easier margin setting both on the typewriter itself and by stored format codes. The change operation is also made simple so that there i no need of resetting the margins on the typewriter each time when the stored format code changes.

The object and other related objects are realized by a typewriter of the invention which includes a keyboard 12; memory means 45 for sequentially storing print-/control data inputted from the keyboard 12; margin set means 19 installed on the keyboard 12 for setting a left margin and a right margin; a printing mechanism 11 including a carriage; and print mode set means 28 for setting, (a) first print mode in which the print data are printed with the printing mechanism 11 between the left margin and the right margin both set by the margin set means 19, and (b) second print mode in which the print data are printed with the printing mechanism 11 from the left margin set by the margin set means 19 and the carriage is returned in accordance with the control data. The typewriter of the invention may further include function mode set means 30 for setting at least store mode in which print/control data inputted from the keyboard 12 are stored in the memory means 45, and print mode in which the print data stored in the memory means 45 are printed out with the printing mechanism 11. The print mode set means 28 is operative only in the print mode setting. Here, the print data includes character data and space data, and the control data includes format data such as return data.

When printing is required in the same format as format data stored in the memory means, the stored format is preferred in the second print mode selected by the print mode set means 28. And for printing in a different format from the stored format data, the current margin format set on the typewriter is preferred in the first print mode selected by the print mode set means 28.

BRIEF DESCRIPTION OF DRAWINGS

The invention may be best understood by referring to the following detailed description of preferred embodiments and the accompanying drawings, wherein like numerals denote like elements and in which:

FIG. 12 is a flow chart showing a subroutine of a third embodiment.

DETAILED DESCRIPTION OF PREFERRED EMBODIMENTS

Hereafter preferred embodiments of the invention will be described in detail according to the attached drawings.

Figure 1:
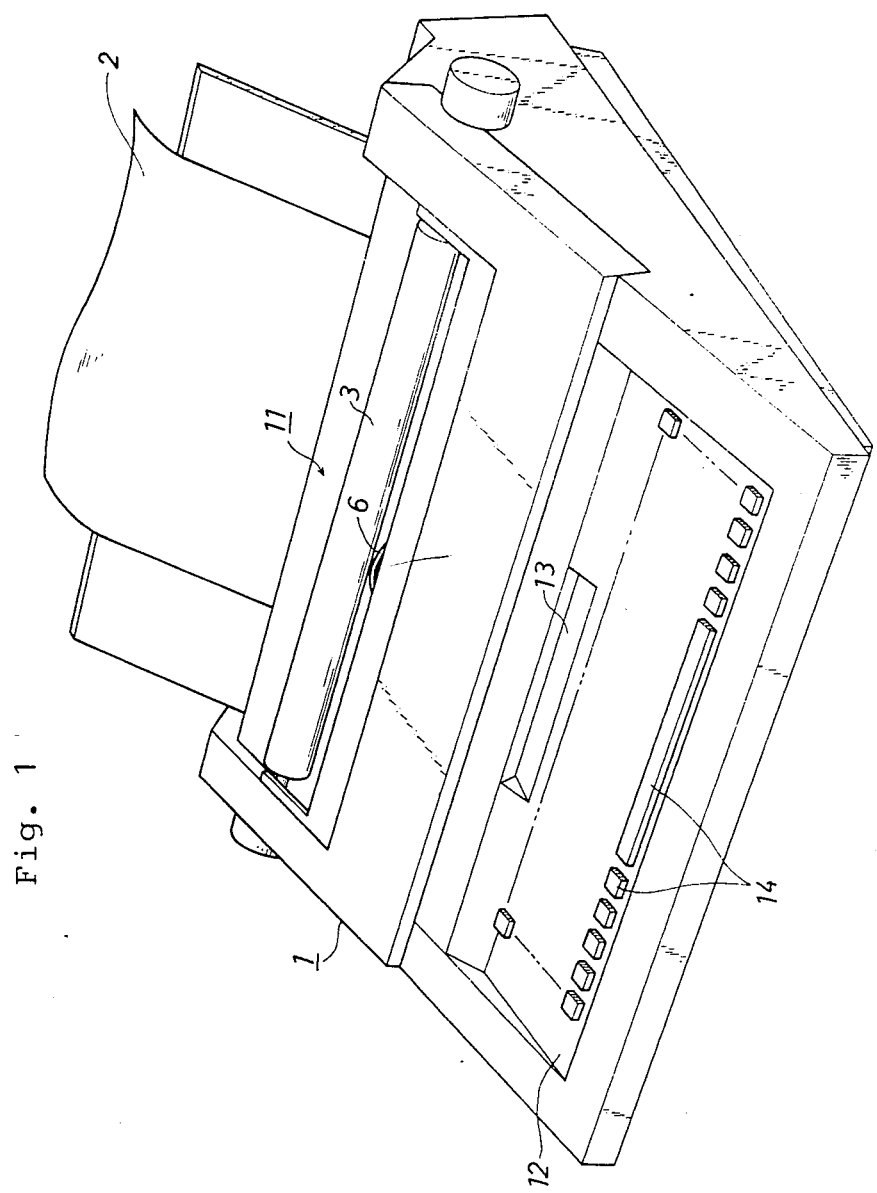
FIG. 1 is a perspective view showing a typewriter of an embodiment of the invention.
Figure 2:
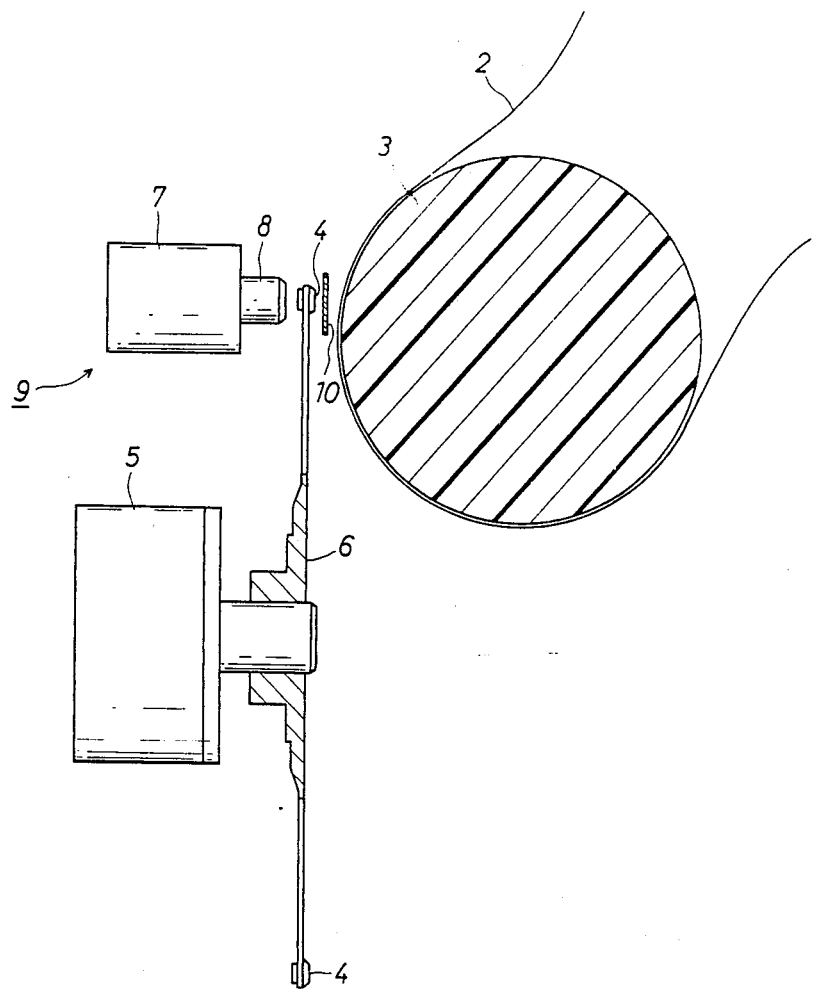
FIG. 2 is a partly sectional view illustrating the printing mechanism of the typewriter of FIG. 1.

As shown in FIG. 1 and FIG. 2, a typewriter of the embodiment has a platen 3 rotatably supported in the rear side of a frame 1 for holding and feeding a printing medium, i.e., printing paper 2. A carriage (not shown) with a printing head 9 is movably provided opposed to and along the platen 3. The printing head 9 includes a type wheel 6 on which a large number of type faces 4 are radially provided and which is rotated by a type selection motor 5, and a printing hammer 8 which is operable by a solenoid 7 so as to strike the type faces 4 of the type wheel 6 on the paper 2. A printing ribbon 10 passes between the platen 3 and the type wheel 6. A printing mechanism 11 mainly consists of the platen 3, the carriage and a driving means (not shown) for driving the platen 3 and the carriage. To print a character, first the printing head 9 is moved to a printing position, a required type face 4 is selected by a rotation of the type wheel 6 so as to be positioned opposed to the platen 3 and is then hit against the paper 2 held on the platen 3 by means of the printing hammer 8. The character is printed on the paper 2 by the printing ribbon 10.

Figure 3:
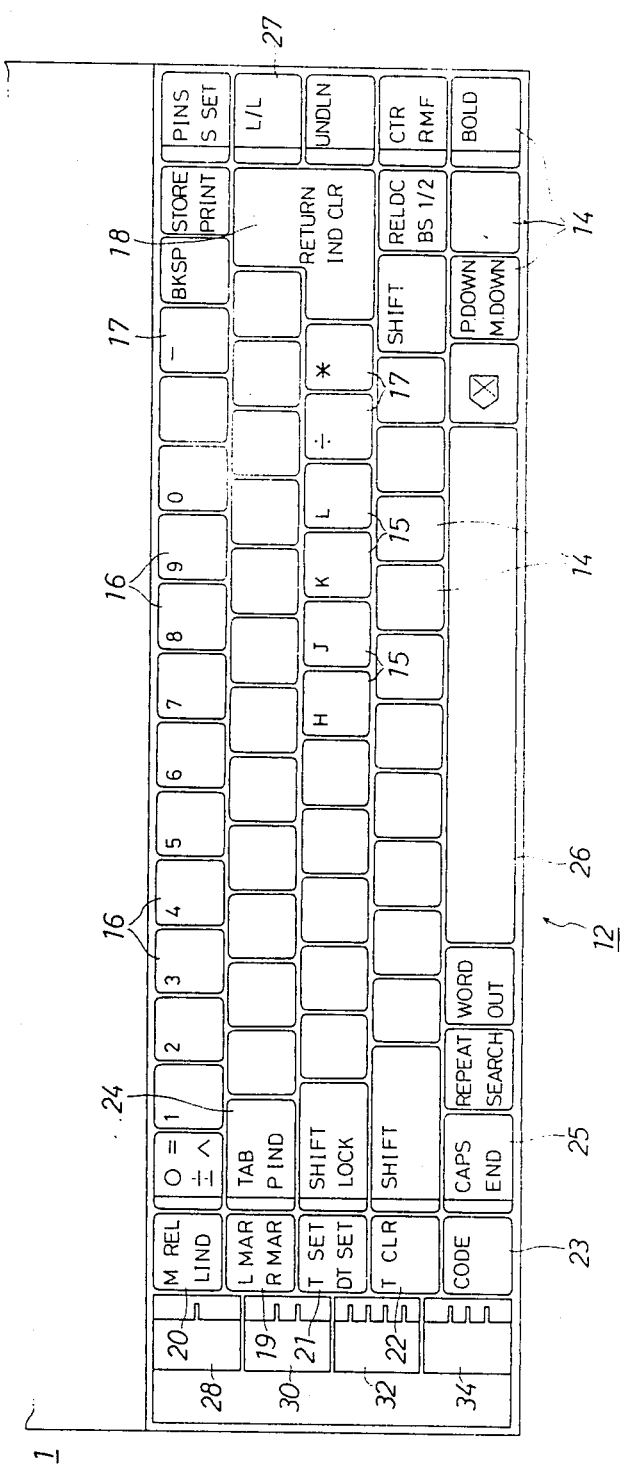
FIG. 3 is an enlarged plan view illustrating the keyboard of the typewriter of FIG. 1.

In the front top surface of the typewriter there is a keyboard 12 on which various keys 14 are arranged for operating the typewriter. As shown in FIG. 3, the keys 14 include, like general typewriters, character keys, i.e., alphabetic keys 15 for inputting alphabetic letters, numeric keys 16 for inputting numerical figures and symbol keys 17 for inputting symbols such as hyphen. The keys 14 further include functional keys, that is, a return key 18, a margin set key 19 for setting left and right margins, a margin release key 20, a tab set key 21, a tab clear key 22, a code key 23, a tab key 24, an end key 25, a space bar 26 and a line by line mode key (L/L mode key) 27 for setting a L/L mode to print out data in a line or to store the data in a line in memory means described hereinafter. Here, the end key 25 also functions as a capital key and, only when the code key 23 is pressed simultaneously with the end key 25, the key 25 functions as the end key in order to control a store mode described below.

Figure 4:
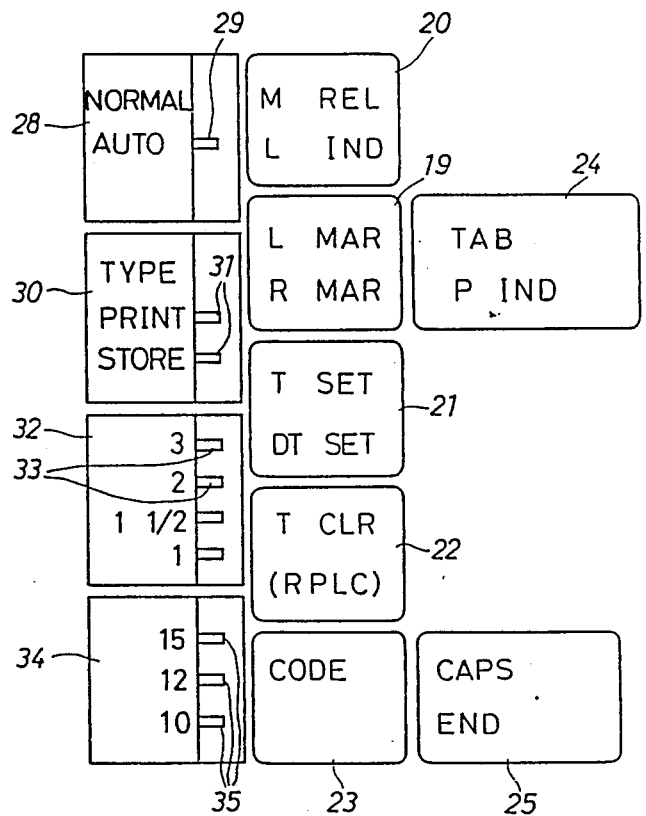
FIG. 4 is a further enlarged plan view showing a part of the keyboard of FIG. 3.

On the left end of the keyboard 12 of FIG. 3 or FIG. 4 an operation mode selector key 28 is provided as the print mode set means for selecting either of two mode settings, i.e., a normal mode setting or an auto mode setting. In the normal mode, data inputted from the keyboard 12 are printed as they are. In the auto mode, when the space bar 26 or the hyphen key 17 is pressed in a hot zone (area that contains predetermined number of character spaces before the right margin position), the carriage return is executed. On the operation mode selector key 28 the respective mode is expressed as 'NORMAL' and 'AUTO', and an indication lamp 29 for showing the auto mode is provided next to the operation mode selector key 28. A functional mode selector key 30 is provided as the function mode set means for selecting any of three mode settings, that is, a type mode setting for printing data inputted by the keys 14 as they are, a store mode setting for storing data inputted by the keys 14 in the memory means described below and a print mode setting for printing data stored in the memory means. On the functional mode selector key 30 respective mode is expressed as 'TYPE', 'STORE' and 'PRINT' and indication lamps 31 for respectively showing the print mode and the store mode are provided next to the functional mode selector key 30. A line spacing selector key 32 is provided for selecting any of four line spacings. Each line spacing is expressed by numeric figures on the line spacing selector key 32 and indication lamps 33 are provided thereto. A typing pitch selector key 34 is provided for selecting any of three typing pitches. Each typing pitch is expressed by numeric figures thereon and indication lamps 35 are provided thereto.

Figure 5:
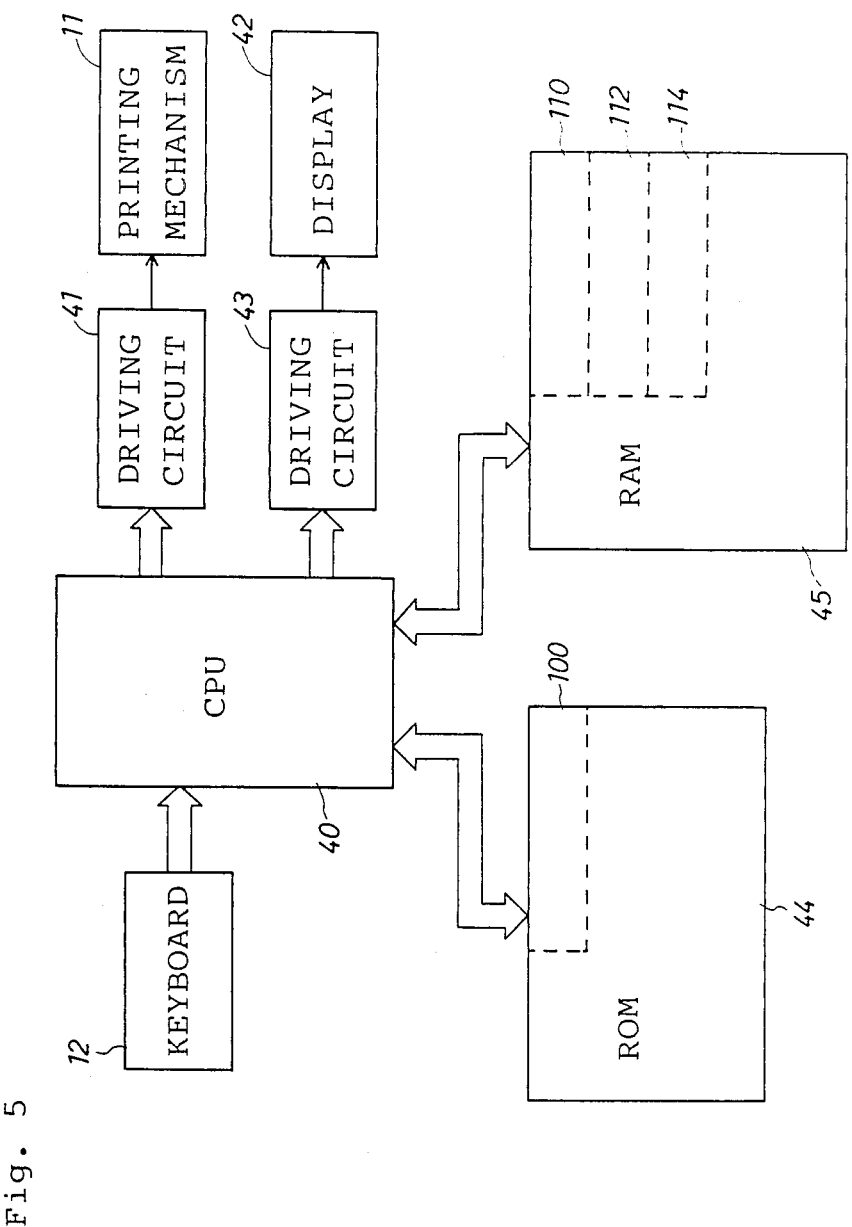
FIG. 5 is a block diagram showing an electronic construction of the typewriter of the embodiment.

According to the block diagram of FIG. 5, explained is the control circuit for controlling the typewriter in response to data inputted from the keyboard 12.

The control means is embodied in a Central Processing Unit (CPU) 40 to which the printing mechanism 11 is connected through a driving circuit 41 and to which a display 42 including the lamps 29, 31, 33 and 35 is connected through a driving circuit 43. Furthermore, the keyboard 12, a Read Only Memory (ROM) 44 and a Random Access Memory (RAM) 45 as the memory means are connected to the CPU 40. The ROM 44 includes a program memory 100, wherein the program memory 100 stores programs for controlling operation of the typewriter including process steps shown in the flow charts of FIGS. 6 through 12. The RAM 45 includes an input buffer 110 as a first memory means, a print buffer 112, a text memory 114 as a second memory means, other memories and counters and registers required for execution of the programs. The input buffer 110 temporarily stores format data such as left and right margins, tabs, typing pitches and line spacings respectively set by the margin set key 19, the tab set key 21, the typing pitch selector key 34 and the line spacing selector key 32, and character data inputted by the alphabetic keys 15, the numeric keys 16, etc. The print buffer 112 temporarily stores print data corresponding to letters, figures and symbols to be printed by the printing mechanism 11. The text memory 114 stores character data such as letters, figures and symbols and format data all inputted in the store mode setting described above.

In the typewriter of the embodiment, when the store mode setting is selected by the functional mode selector key 30, automatically the L/L mode and the auto mode are set by the CPU 40. Under this condition, if the return key 18 is pressed or the space bar 26 or the hyphen key 17 is pressed in the hot zone, the carriage is returned and print data in a line stored in the input buffer 110 of the RAM 45 are transferred to the text memory 114. At this time, the CPU 40 eliminates space data directly preceding the return data in the input buffer 110, and writes the return data immediately after the last character data in the input buffer 110. After setting the store mode, it is possible to cancel the L/L mode or the auto mode using the L/L mode key 27 or the operation mode selector key 28.

When the print mode setting is selected by the functional mode selector key 30, the operation mode is automatically set to the auto mode by the CPU 40. Under this condition, to print the print data stored in the text memory 114 by the printing mechanism 11, the CPU 40 executes the first print mode; that is, the print data are printed between the right and left margins both set by the margin set key 19. These margins are different from those corresponding to the format data stored in the text memory 114.

After the print mode setting is selected by the functional mode selector key 30 and when an operator cancels the auto mode setting and selects the normal mode setting with the operation mode selector key 28, the CPU 40 executes the second print mode to print the print data stored in the text memory 114 of the RAM 45 by the printing mechanism 11. Namely, the print data are printed between the left margin set by the margin set key 19 and the right margin determined by the format data stored in the text memory 114.

The process steps executed by the typewriter 12 as a first embodiment of this invention is explained based on the flow charts of FIG. 6 through FIG. 10.

Figure 6:
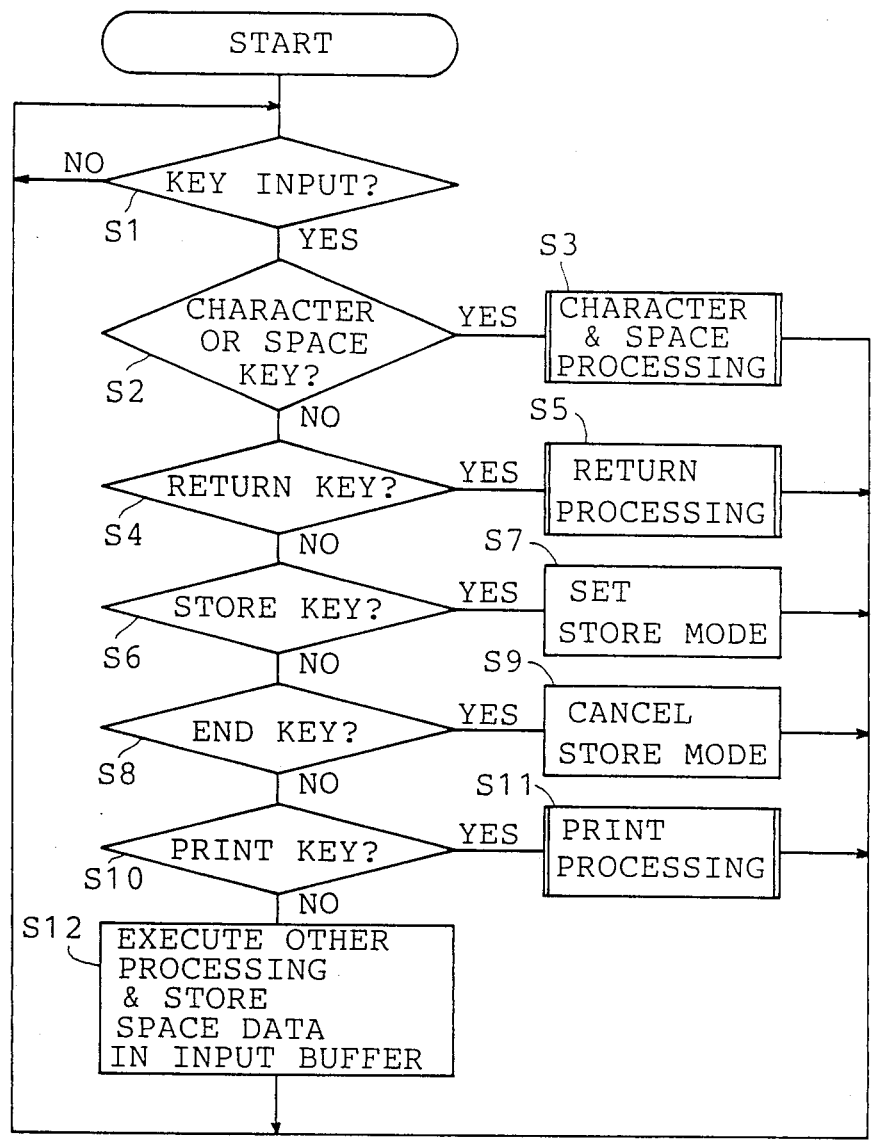
FIG. 6 is a flow chart showing a main routine executed by the CPU 40 of the typewriter shown in FIG. 5.
Figure 7:
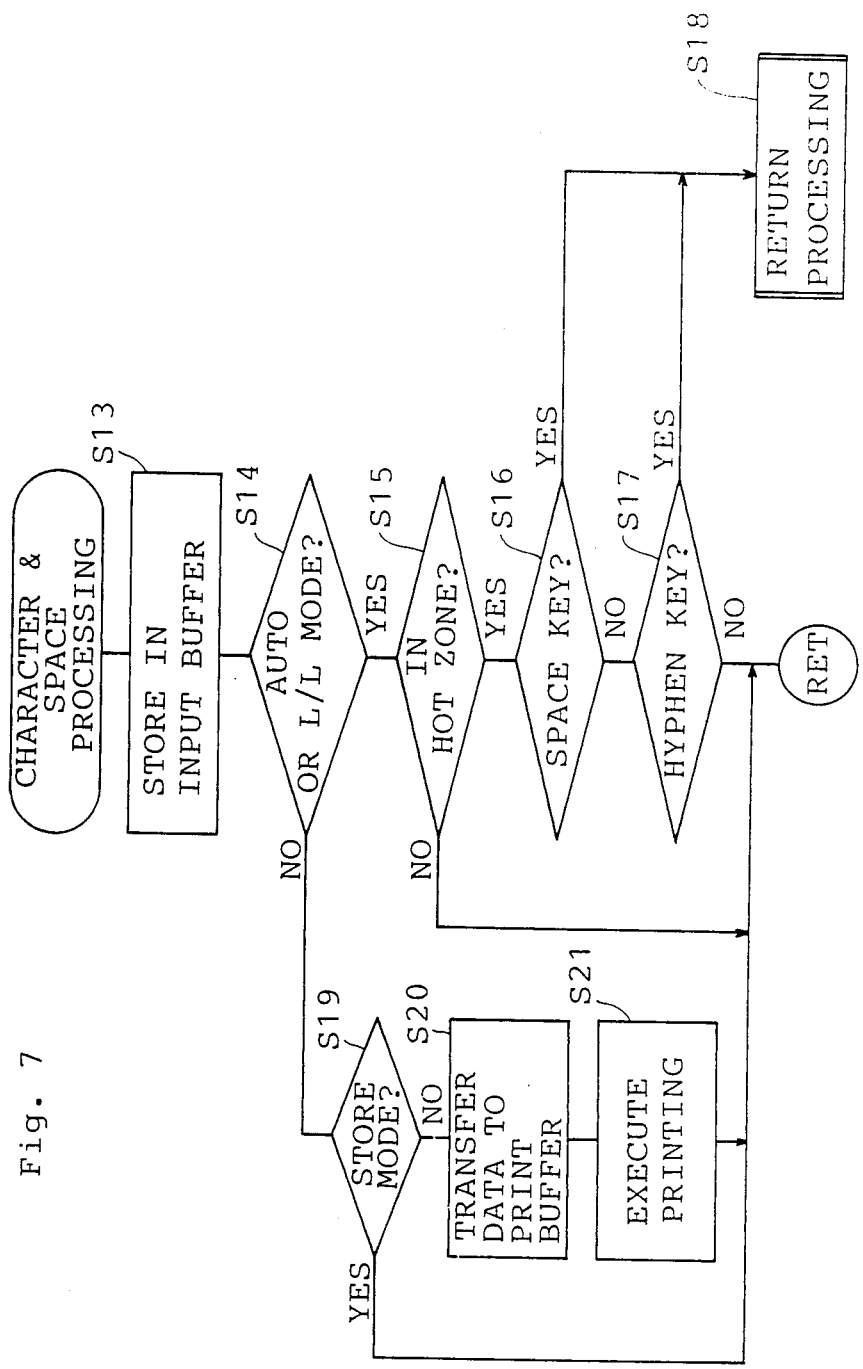
FIG. 7 is a flow chart showing a subroutine of the character & space processing in the flow chart of FIG. 6.
Figure 8:
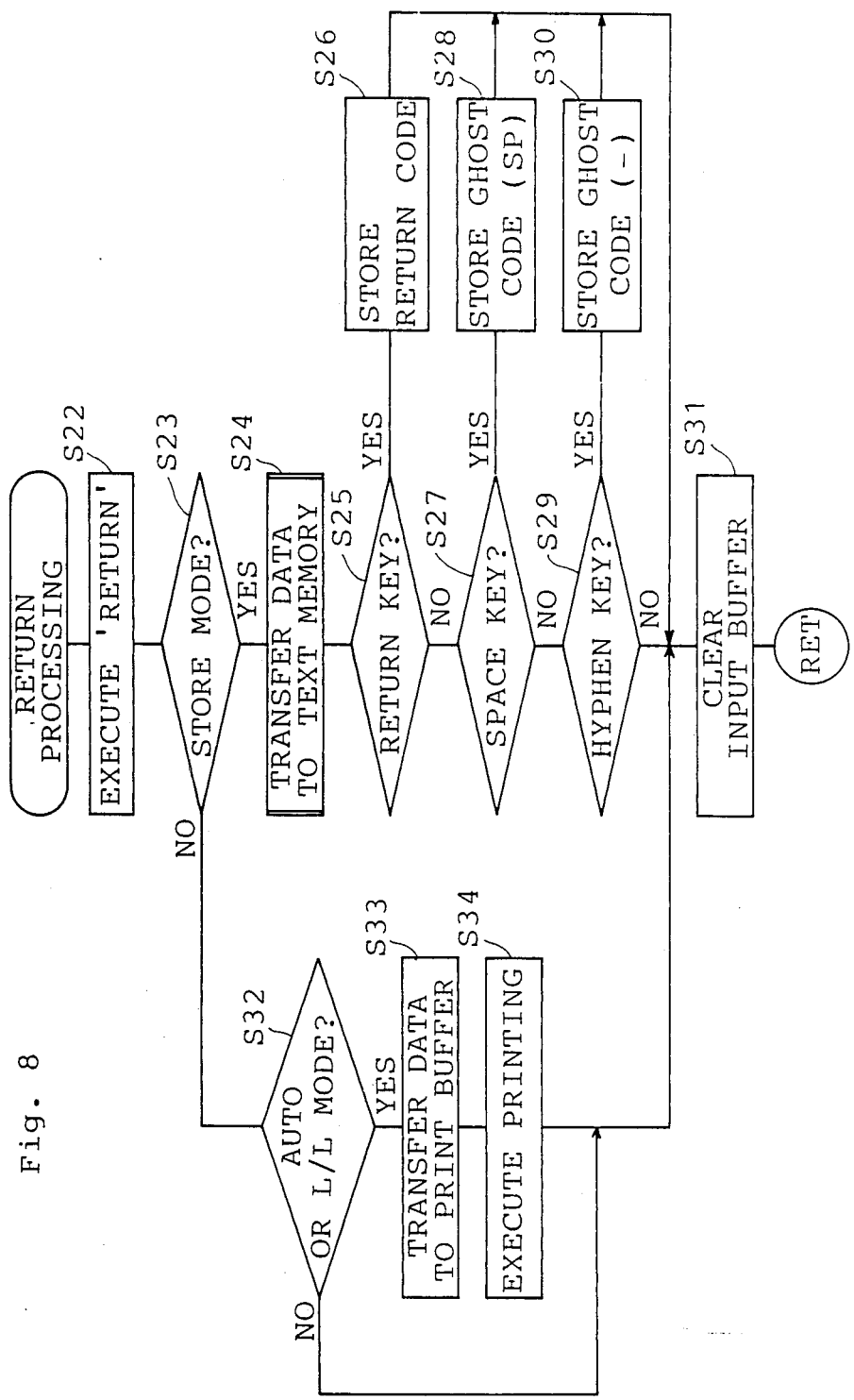
FIG. 8 is a flow chart showing a subroutine of the return processing in the flow chart of FIG. 6.
Figure 9A:
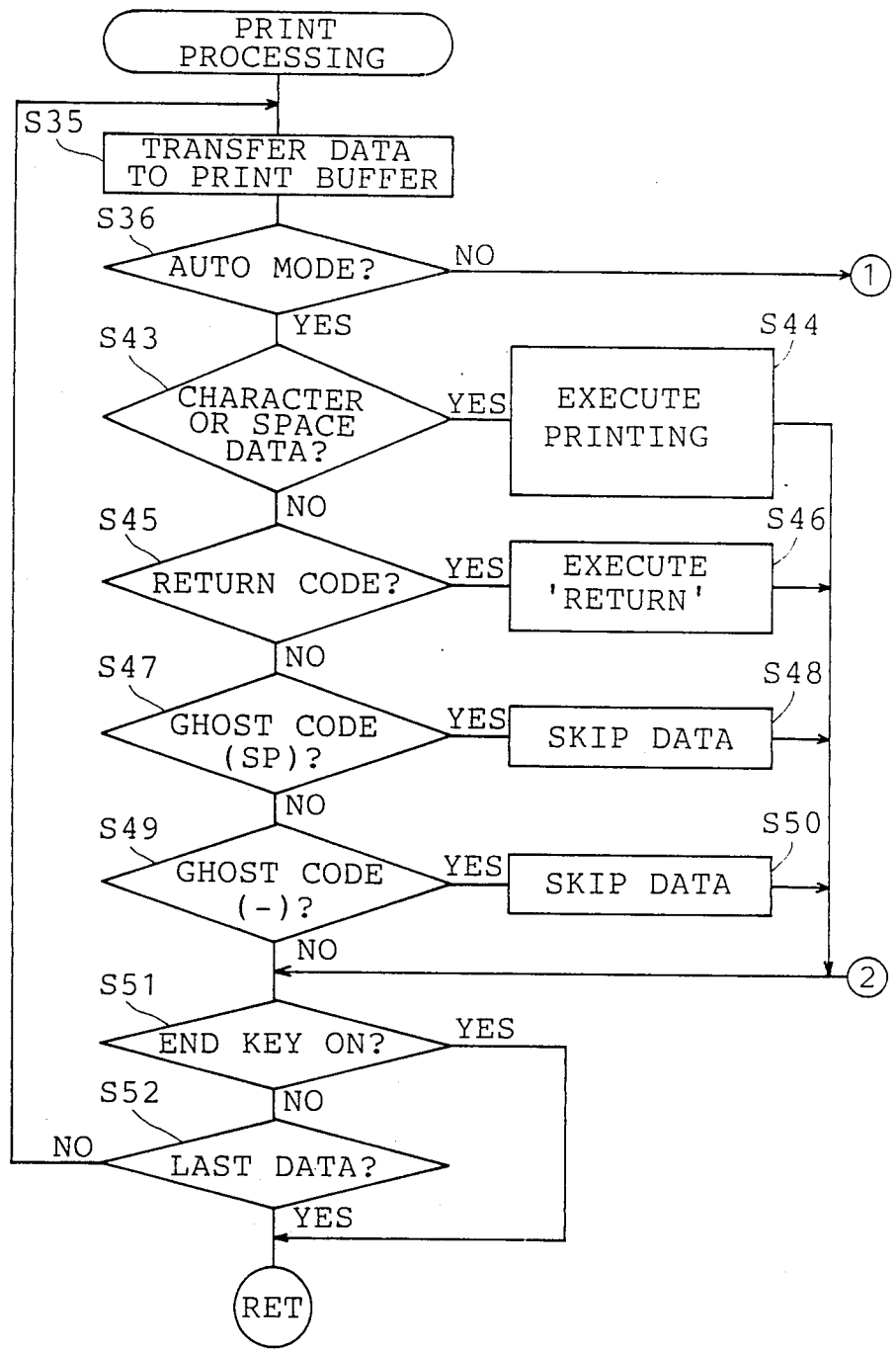
FIGS. 9A and 9B are flow charts showing a subroutine of the print processing in the flow chart of FIG. 6.

When a power source is turned on, the CPU 40 starts the main routine shown in FIG. 6. First, at the decision point S1, it is determined if any of the keys 14 on the keyboard 12 is operated. If the answer is YES, the program proceeds to the decision point S2 where it is determined if the operated key is any one of the character keys 15 to 17 or the space bar 26. If the operated key is any one of these keys, the program proceeds to step S3, i.e., the subroutine of FIG. 7 showing the character and space processing, and if not, the program proceeds to the decision point S4 where it is determined if the operated key is the return key 18. If the answer is YES, the program proceeds to step S5, i.e., the subroutine of FIG. 8 showing the return processing, and if not, the program proceeds to the decision point S6 where it is determined if the operated key is the functional mode selector key 30 to select the store mode setting. If the answer is YES, the program proceeds to step S7 where the store mode is set, and if not, the program proceeds to the decision point S8 where it is determined if the operated key is the end key 25. If the operated key is the end key, the program proceeds to step S9 where the store mode is canceled, and if not, the program proceeds to the decision point S10 where it is determined if the operated key is the functional mode selector key 28 to select the print mode setting. If the answer is YES, the program proceeds to step S11, i.e., the subroutine of FIG. 9A showing the print processing, and if not, that is, the operated key is any key other than the above keys, the program proceeds to step S12 where processing corresponding to the operated key is executed and a space data is written into the input buffer 110 of the RAM 45.

The subroutine of FIG. 7 showing the character and space processing is explained. At step S13, data corresponding to the operated key, i.e., one of the character keys 15, 16 and 17 or the space bar 26, is stored in the input buffer 110 of the RAM 45. The determination is made if either the auto mode or the L/L mode is set at the decision point S14. If either of the mode settings is selected, the program proceeds to the decision point S15 where it is determined if its printing position is in the hot zone. If the answer is NO at the decision point S15, the program returns to the main routine of FIG. 6, and if the printing position is determined to be in the hot zone, the program proceeds to the decision points S16 and S17 where the determination is made one after another if the operated key is the space bar 26 or the hyphen key 17. If the operated key is neither the space bar 26 nor the hyphen key 17, the program returns to the main routine of FIG. 6, and if it is either of the two keys 26 and 17, the program proceeds to step S18, i.e., the subroutine of FIG. 8 showing the return processing.

On the contrary, if the answer of the decision point S14 is NO, that is, neither the auto mode setting nor the L/L mode setting is selected, the program proceeds to the decision point S19 where it is determined if the store mode setting is selected as the functional mode. If the answer is YES at S19, the program returns to the main routine of FIG. 6 and if not, the program proceeds to step S20 where the print data stored in the input buffer 110 of the RAM 45 is transferred to the print buffer 112. At the next step S21, the printing mechanism 11 is driven to print the print data stored in the print buffer 112 on the paper 2.

The subroutine of FIG. 8 showing the return processing is explained. First at step S22, the carriage with the printing mechanism 11 is returned to the position of the left margin. At the decision point S23 it is determined if the store mode setting is selected as the functional mode. If the answer is YES at S23, the program proceeds to step S24, i.e., the subroutine of FIG. 10, where the print data are transferred from the input buffer 110 to the text memory 114 of the RAM 45. The program then successively proceeds to the decision points S25, S27 and S29 where it is determined if the carriage return is caused by pressing the return key 18, the space bar 26 or the hyphen key 17. If it is determined to be caused by the pressing of the return key 18 at the decision point S25, the program proceeds to step S26 at which a return code data is stored in the text memory 114. If it is determined to be caused by the space bar 26 operation in the hot zone at the decision point S27, a (sp)-ghost code data is stored after the space code data in the text memory 114 at step S28, and if it is determined to be caused by the hyphen key 17 operation in the hot zone at the decision point S29, a (—)—ghost code data is stored after the hyphen code data in the text memory 114 at step S30. Both the ghost code data are introduced for the determination of the carriage return, which will be explained later. The program proceeds to step S31 where the print data in the input buffer 110 are cleared and then returns to the main routine of FIG. 6.

On the other hand, if the current functional mode setting is determined not to be the store mode at the decision point S23, the program proceeds to the decision point S32 where it is determined if either of the auto mode or the L/L mode is set. If the answer is NO at S32, the program proceeds to step S31 where the print data in the input buffer 110 is cleared and then returns to the main routine of FIG. 6. If the answer is YES at the decision point S32, the program proceeds to step S33 where the print data stored in the input buffer 110 of the RAM 45 are transferred to the print buffer 112, and then to step S34 where the printing mechanism 11 is driven to print the print data in a line. The program proceeds to step S31 where the data are cleared and then returns to the main routine of FIG. 6.

Figure 9B:
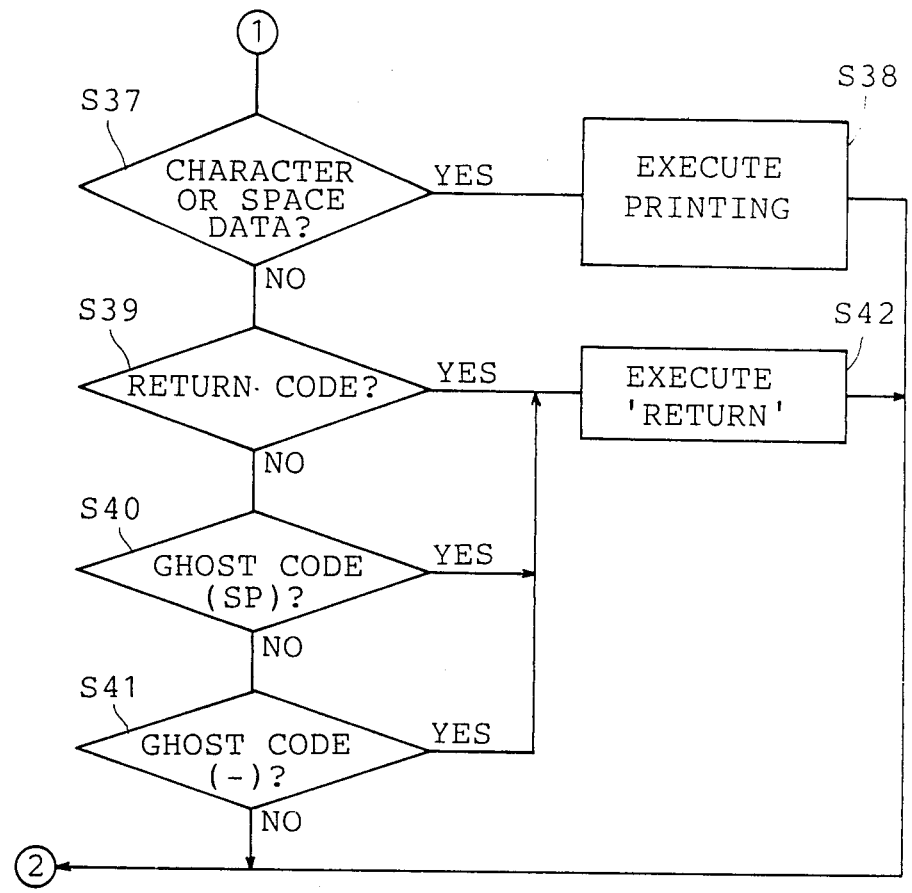

The subroutine of the print processing executed in the print mode setting is explained based on the flow charts of FIGS. 9A and 9B. First at step S35 of FIG. 9A, the print data is read out from the text memory 114 of the RAM 45 and is transferred to the print buffer 112. At the decision point S36, it is determined if the auto mode setting is selected as the operation mode. If the answer is NO, that is, when the normal mode setting is selected, the program proceeds to the decision point S37 of FIG. 9B where it is determined if the transferred data is one of the character data or the space data. If the answer is YES at the decision point S37, the program then proceeds to step S38 where the print data is printed by the printing mechanism 11 between the left margin set by the margin set key 19 and the right margin determined based on the format data in the print buffer 112. That is, the right margin set by the margin set key 19 on the keyboard 12 is neglected and the right margin is determined by the format data, which is stored in the text memory 114 with the print data. When the transferred data is determined to be neither the character data nor the space data at the decision point S37, the program then successively proceeds to the decision points S39, S40 and S41 where the determination is made if the transferred data is the return code data, the (sp)-ghost code data or the (—)—ghost code data. If it is any of these code data, the program proceeds to step S42 where the carriage is returned to the position of the left margin. Accordingly, in the normal mode setting, i.e., in the second print mode, there is no necessity to set the right margin directly by the margin set key 19 since the printing is executed based on the format data stored in the text memory 114.

On the other hand, if the answer is YES at the decision point S36 of FIG. 9A, that is, if the auto mode setting is selected as the operation mode, the program proceeds to the decision point S43 of FIG. 9A where it is determined if the transferred data is either a character data or a space data. When the transferred data is determined to be identical with character data or space data, the program proceeds to step S44 at which the print data stored in the print buffer 112 is printed by the printing mechanism 11 between the left margin and the right margin both set by the margin set key 19. That is, when the printing position reaches to the right margin set by the margin set key 19 on the keyboard 12, the carriage is returned. When the answer is NO at the decision point S43, the program proceeds to the decision points S45, S47 and S49 where the transferred data is successively compared with the return code data, the (sp)-ghost code data and the (—)—ghost code data. If the transferred data is determined to be identical with the return code data at the decision point S45, the program proceeds to step S46 at which the carriage is returned. If the transferred data is determined to be identical with the (sp)-ghost code data at the decision point S47 or with the (—)—ghost code data at the decision point S49, the program proceeds to step S48 or step S50 at which the data is skipped, that is, no operation is made with this code by the printing mechanism 11. Accordingly, when the auto mode setting is selected, i.e., in the first print mode, the printing is executed between the left and right margins set by the margin set key 19 regardless of the format data stored in the text memory 114.

When both the answers at the decision points S41 and S49 are NO or after each processing at step S38, S42, S44, S46, S48 or S50 is completed, the program proceeds to the decision point S51 where the determination is made if the end key is operated. If not, the program proceeds to the decision point S52 where the determination is made if the currently processing data is the last data stored in the text memory 114. If the answer is NO at S52, the program returns to step S35 and repeats the above process steps S35 through S52. Only when it is determined that the end key is operated at the decision point S51 or that the currently processing data is the last data in the text memory 114, the program returns to the main routine of FIG. 6.

Figure 10:
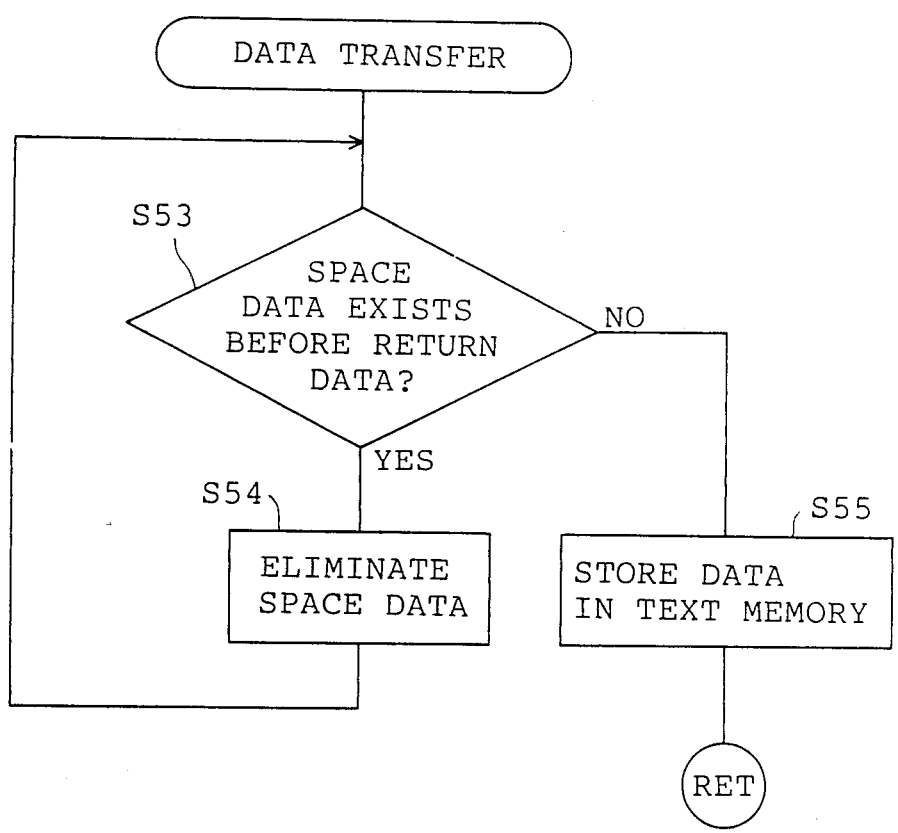
FIG. 10 is a flow chart showing a subroutine of the data transfer in the flow chart of FIG. 8.

The data transfer from the input buffer 110 to the text memory 114 accompanied with the carriage return in the store mode setting is explained base on the flow chart of FIG. 10. First at the decision point S53, it is determined if a space data exists immediately before return data in the input buffer 110. If the answer is YES, the program proceeds to step S54 where the space data is eliminated. These two steps S53 and S54 are repeatedly executed until the return data is positioned immediately after data other than space data. When the return data becomes directly following the data other than space data, the program proceeds to step S55 at which the print data in a line stored in the input buffer 110 are transferred to and stored in the text memory 114. Accordingly, even if the space bar 26 or the tab key 24 is mistakenly operated before the return key is operated in the store mode setting, the unnecessary space data can be eliminated not to transfer to the text memory 114. Thus, when the printing is executed based on the data stored in the text memory 114 by the printing mechanism 11, as shown in the subroutine of FIGS. 9A and 9B, the typewriter of the first embodiment can prevent the carriage from spacing uselessly before executing the return.

Figure 11:
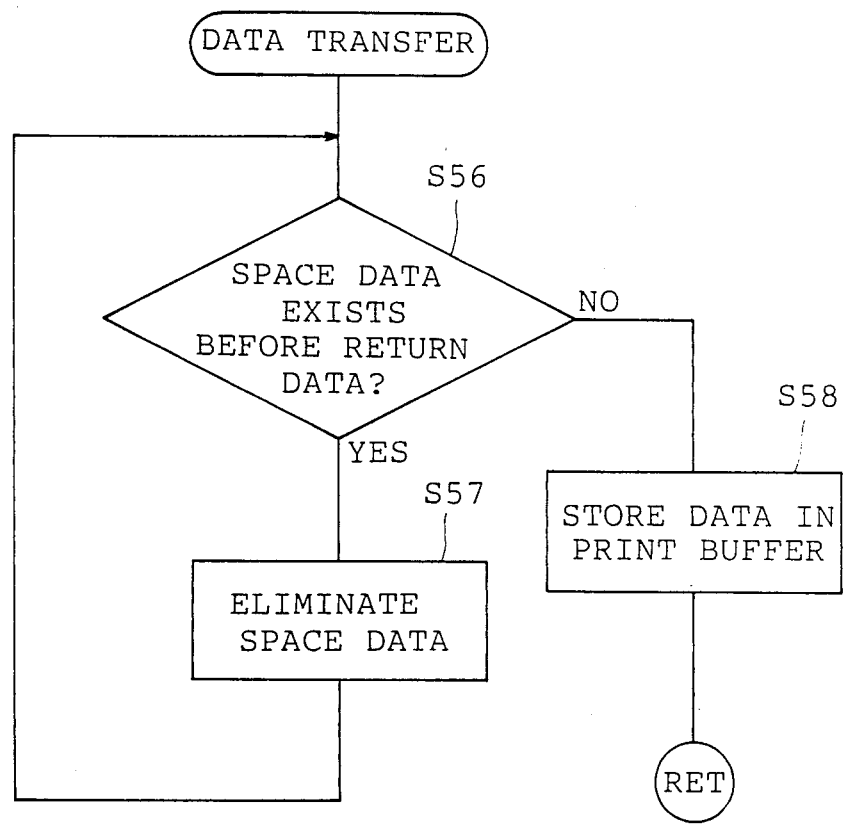
FIG. 11 is a flow chart showing a subroutine of a second embodiment.

A second embodiment of the invention is now explained according to the flow chart of FIG. 11. In this embodiment, when the print data are transferred from the input buffer 110 to the print buffer 112 at step S33 of FIG. 8, the space data immediately before the return data are eliminated. Other process steps of the second embodiment are the same as those of the first embodiment. At the decision point S56, the determination is made if a space data exists immediately before return data in the input buffer 110. If the answer is YES at S56, the program proceeds to step S57 at which the space data is eliminated and the steps S56 and S57 are repeatedly executed until the return data is positioned immediately after data other than space data. When the return data becomes directly following the data other than space data, the program proceeds to step S58 at which the print data in a line stored in the input buffer 110 are transferred to and stored in the print buffer 112. Accordingly, the typewriter of the second embodiment can also prevent the carriage from spacing uselessly.

A third embodiment of the invention is now explained based on the flow chart of FIG. 12. In this embodiment, while the print mode setting is selected and when the print data are transferred from the text memory 114 to the print buffer 112 at step S35 of FIG. 9A, space data immediately before the return data are eliminated. Other process steps of the third embodiment are the same as those of the first embodiment. At the decision point S59, it is determined if a space data exists immediately before return data read out from the text memory 114. If the answer is YES, the program proceeds to step S60 at which the space data is eliminated and the steps S59 and S60 are repeatedly executed until the return data is positioned immediately after data other than space data. When the return data becomes directly following the data other than space data, the program proceeds to step S61 at which the print data in a line read out from the text memory 114 are transferred to and stored in the print buffer 112. Accordingly, the typewriter of the third embodiment can also prevent the carriage from spacing uselessly.

Another embodiment of the invention is briefly explained. In the preceding embodiments, the carriage is returned by the return code or the ghost codes, both embodying the control data, in the second print mode. This time, the control data relating to the left and the right margins are stored at the beginning of the text data stored in the text memory. One example of the control data is shown by a set of two data; one representing left margin position and the other representing the right margin position. In this embodiment, when the two control data are first read out from the text memory 114, the difference of the two margin position data, i.e., difference of the right margin position from the left margin position, is calculated and it is stored in a buffer in the RAM 45. The printing operation is started from the left margin position set by the margin set key 19 on the keyboard 12 in every printing line. The number of characters including spaces are successively counted within every printing line and when the counted number coincides with the difference data stored in the buffer, the carriage is returned. In this case, of course, there is no need of introducing the ghost codes in the text memory 114 and when a return data is transferred from the text memory 114 to the printing mechanism 11, the carriage is also returned.

Although the invention has been described with reference to specific embodiments thereof, it will be apparent that numerous changes and modifications may be made therein without departing from the scope of the invention. It is, therefore, to be understood that it is not intended to limit the invention to the embodiments shown but only by the scope of the claims which follow.

What is claimed is:

1. A typewriter comprising:
    a keyboard;
    memory means for sequentially storing input data inputted from the keyboard, said input data including both print data and carriage position control data;
    margin set means installed on the keyboard for mechanically setting a left margin and a right margin on said typewriter;

a printing mechanism including a carriage;

means providing a first print mode of the printing mechanism and a second print mode of the printing mechanism said second print mode including means for positioning the carriage relative to the left margin responsive to the carriage position control data stored in the memory means; and print modes selection means for selecting between the first print mode wherein the print data are printed by the printing mechanism between the left margin and the right margin both set by the margin set means, or the second print mode wherein the print data are printed by the printing mechanism from the left margin set by the margin set means and the carriage is positioned relative to the left margin set by the margin set means in accordance with the carriage position control data stored in the memory means.

2. A typewriter according to claim 1, wherein the typewriter further comprises:

function mode selection means for selecting at least, a store mode wherein said input data inputted from the keyboard are stored in the memory means, and a third print mode wherein the print data stored in the memory means are printed out with the printing mechanism; and the print mode selection means being operative only in said third print mode.

3. A typewriter according to claim 1, wherein the keyboard comprises character keys, a space bar and a return key, the memory means storing print data including a character data and a space data and control data including a return data inputted respectively by the operation of the character keys, the space bar and the return key, and the carriage being returned by the return data in the control data during said second print mode.

4. A typewriter according to claim 2, wherein the keyboard comprises character keys, a space bar and a return key, the memory means storing print data including a character data and a space data and control data including a return data inputted respectively by the operation of the character keys, the space bar and the return key, and the carriage being returned by the return data in the control data during said second print mode.

5. A typewriter according to claim 3, wherein space data directly preceding the return data is eliminated in the memory means.

6. A typewriter according to claim 4, wherein space data directly preceding the return data is eliminated in the memory means.

7. A typewriter according to claim 6, wherein the function mode selection means is further operable for selecting a type mode wherein the print data inputted from the keyboard are directly printed with the printing mechanism.

8. A printer comprising:

a platen for holding a paper;

a printing mechanism comprising a carriage which moves along the platen, the carriage being provided with a print head for printing characters on the paper;

margin setting means for mechanically setting a left and a right margin for determining a moving range of the carriage on said printer;

first memory means for storing the left and right margins set by the margin setting means;

second memory means for storing print data including character data and carriage position control data embedded among the character data;

means providing a first print mode of the printing mechanism and a second print mode of the printing mechanism said second print mode including means for positioning the carriage relative to the left margin responsive to the carriage position control data stored in the memory means; and control means for controlling the print head to print characters in the first or the second print mode, wherein the first print mode, the control means controls the carriage to move in accordance with the left and right margin data stored in the first memory means, and in the second print mode, the control means controls the print head to print characters on the paper based on character data stored in the second memory means and controls the carriage to move from the left margin stored in the first memory means in accordance with the embedded carriage position control data stored in the second memory means, overriding the right margin stored in the first memory means.

* * * * *